United States Patent
Kim et al.

(10) Patent No.: US 9,806,939 B2
(45) Date of Patent: Oct. 31, 2017

(54) METHOD AND APPARATUS FOR LINEAR PROTECTION SWITCHING

(71) Applicant: ELECTRONICS AND TELECOMMUNICATIONS RESEARCH INSTITUTE, Daejeon (KR)

(72) Inventors: Dae Ub Kim, Daejeon (KR); Jeong Dong Ryoo, Daejeon (KR); Tae Sik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 201 days.

(21) Appl. No.: 14/514,822

(22) Filed: Oct. 15, 2014

(65) Prior Publication Data

US 2015/0109900 A1  Apr. 23, 2015

(30) Foreign Application Priority Data

Oct. 17, 2013  (KR) .................. 10-2013-0124240
Jan. 2, 2014  (KR) .................. 10-2014-0000481
Jan. 7, 2014  (KR) .................. 10-2014-0002068
Feb. 11, 2014  (KR) .................. 10-2014-0015734
Sep. 22, 2014  (KR) .................. 10-2014-0125899

(51) Int. Cl.
| H04L 12/00 | (2006.01) |
| H04L 12/24 | (2006.01) |
| H04L 12/707 | (2013.01) |
| H04L 12/703 | (2013.01) |

(52) U.S. Cl.
CPC .......... *H04L 41/0663* (2013.01); *H04L 45/22* (2013.01); *H04L 45/28* (2013.01)

(58) Field of Classification Search
CPC ......... H04L 45/00; H04L 45/50; H04L 45/22; H04L 45/28; H04L 12/5693
See application file for complete search history.

(56) References Cited

U.S. PATENT DOCUMENTS

| 7,197,008 | B1 * | 3/2007 | Shabtay | H04L 12/4633 |
| | | | | 370/218 |
| 7,804,767 | B1 * | 9/2010 | Owens | H04L 45/00 |
| | | | | 370/217 |
| 9,030,925 | B2 * | 5/2015 | Cheung | H04L 45/24 |
| | | | | 370/216 |
| 2003/0065815 | A1 * | 4/2003 | Klink | H04Q 11/0478 |
| | | | | 709/239 |
| 2007/0133398 | A1 * | 6/2007 | Zhai | H04L 45/00 |
| | | | | 370/228 |

(Continued)

FOREIGN PATENT DOCUMENTS

| CN | 1848842 A | 10/2006 |
| CN | 101951303 A | 1/2011 |
| CN | 102882590 A | 1/2013 |

*Primary Examiner* — Sai Aung
(74) *Attorney, Agent, or Firm* — Ladas & Parry LLP

(57) ABSTRACT

Provided is a linear protection switching method of a node, wherein the method includes selecting a local request based on a priority of at least one local request, determining a global request based on a priority between the selected local request and a remote message, and performing a state transition based on the global request.

20 Claims, 8 Drawing Sheets

(56) References Cited

U.S. PATENT DOCUMENTS

| | | | |
|---|---|---|---|
| 2008/0310429 A1* | 12/2008 | Klink | H04Q 11/0478 370/400 |
| 2011/0058472 A1* | 3/2011 | Owens | H04L 45/00 370/228 |
| 2012/0082026 A1* | 4/2012 | Ryoo | H04L 45/28 370/220 |
| 2012/0106507 A1* | 5/2012 | Venkataswami | H04L 45/50 370/331 |
| 2012/0163163 A1 | 6/2012 | Kim et al. | |

* cited by examiner

METHOD AND APPARATUS FOR LINEAR PROTECTION SWITCHING

CROSS-REFERENCE TO RELATED APPLICATION(S)

This application claims the priority benefit of Korean Patent Application No. 10-2013-0124240, filed on Oct. 17, 2013, Korean Patent Application No. 10-2014-0000481, filed on Jan. 2, 2014, Korean Patent Application No. 10-2014-0002068, filed on Jan. 7, 2014, Korean Patent Application No. 10-2014-0015734, filed on Feb. 11, 2014, in the Korean Intellectual Property Office, and Korean Patent Application No. 10-2014-0125899 filed on Sep. 22, 2014 in the Korean Intellectual Property Office, the disclosures of which are incorporated herein by reference.

BACKGROUND

1. Field of the Invention

The present invention relates to a packet network or a packet transport network, and more particularly, to a linear protection switching method and apparatus in a packet network or a packet transport network.

2. Description of the Related Art

To facilitate stable operation of a communication network and provide an uninterrupted service to users and maximize efficiency of the network, a management method that may respond to a fault or performance deterioration of the network is required. The management method may include, for example, restoration and protection switching. The restoration may be used to restore an interrupted service to an original state of the service using an available network path and capacity in response to an occurrence of a fault. The protection switching may be used to rapidly restore the network from a fault by pre-setting a required path and a bandwidth between nodes.

The protection switching may be performed in a packet network or a packet transport network. To perform linear protection switching in such a network, a method of managing a switching state and performing path protection switching using an automatic protection switching (APS) message, which is disclosed in Linear Protection Switching in Multi Protocol Label Switching (MPLS)-Transport Profile (TP), Internet Engineering Task Force (IETF) draft draft-zulr-mpls-tp-linear-protection-switching-03.txt, and Telecommunication Standardization Sector of International Telecommunications Union (ITU-T) G.8131.1, and a method of managing a switching state and performing path protection switching using a protection state coordination (PSC) message, which is disclosed in IETF RFC6378 and ITU-T G8131.2, may be used.

SUMMARY

According to an aspect of the present invention, there is provided a linear protection switching method of a node, the method including selecting a local request based on a priority of at least one local request, determining a global request based on a priority between the selected local request and a remote message, and performing a state transition based on the global request.

When the node is in a remote state in which the global request is determined by the remote message and a new local request occurs, and the new local request and the remote message request different protection actions despite the new local request and the remote message having equal priorities, the remote message may be determined to be the global request.

When the node is in a local state in which the global request is determined by the local request and a new remote message is received, and the local request and the new remote message request different protection actions despite the local request and the new remote message having equal priorities, the global request may be determined based on a predetermined rule.

When the local request is a manual switch to protection path (MS-P) request and the new remote message is a manual switch to working path (MS-W) request, the MS-W request may be determined to be the global request.

When one of the selected local request and the remote message is a signal degrade (SD) request on a standby path and another is an SD request on an active path, the SD request on the standby path may be determined to be the global request.

When the remote message is determined to be the global request, the linear protection switching method may further include transmitting a cancel command to cancel the selected local request.

When the selected local request is ignored due to the remote message, the determining of the global request may include informing a local request logic that the selected local request is cancelled.

The informing may occur prior to the performing of the state transition.

A prestored state transition table may be used for the performing of the state transition.

When the selected local request is determined to be the global request, a prestored local state transition table may be used for the performing of the state transition.

When the remote message is determined to be the global request, a prestored remote state transition table may be used for the performing of the state transition.

When the node is in a remote state in which the global request is determined by a first remote message and a second remote message is received, and a priority of the second remote message is higher than a priority of the first remote message, the second remote message may be determined to be the global message.

When the node is in a remote state in which the global request is determined by a first remote message and a second remote message is received, and a priority of the second remote message is lower than a priority of the first remote message and higher than a priority of the selected local request, the second remote message may be determined to be the global message.

When the node is in a remote state in which the global request is determined by a first remote message and a second remote message is received, and a priority of the second remote message is lower than a priority of the first remote message and a priority of the selected local request, the selected local request may be determined to be the global request.

When the node is in a remote state in which the global request is determined by a first remote message, the node may transmit a transmission message including at least one of a top priority local request, a local fault path, and a determined traffic path.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
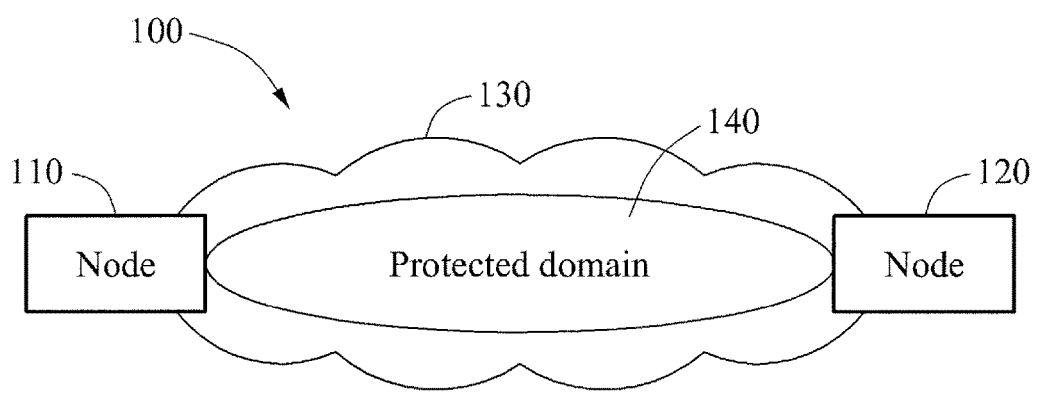
FIG. 1 is a diagram illustrating an example of a multi protocol label switching (MPLS)-transport profile (TP) including a protected domain according to an embodiment of the present invention.

Reference will now be made in detail to example embodiments of the present invention, examples of which are illustrated in the accompanying drawings, wherein like reference numerals refer to the like elements throughout. Example embodiments are described below to explain the present invention by referring to the accompanying drawings, however, the present invention is not limited thereto or restricted thereby.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. Like reference numerals in the drawings denote like elements, and thus their description may be omitted.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

For ease of description, a multi-protocol label switching (MPLS)-transport profile (TP) network will be described as an illustrative example of a packet transport network, however, example embodiments to be described herein may not be limited thereto. Examples embodiments described herein may be applied to all packet networks and packet transport networks including the MPLS-TP network.

FIG. 1 is a diagram illustrating an example of an MPLS-TP network 100.

Referring to FIG. 1, the MPLS-TP network 100 includes a plurality of nodes, for example, 110 and 120, and a label switch router (LSR) 130. Each of the nodes 110 and 120 may be located at a boundary point with an existing network, attach a label to an Ethernet or an Internet protocol (IP) packet to be input, generate an MPLS packet to place the MPLS packet into an MPLS network, and terminate an MPLS connection to move from the MPLS network to another existing network. The nodes 110 and 120 may be interchangeably used with a label edge router (LER). The LSR 130 may be connected to the nodes 110 and 120 and perform a label switching function.

Figure 2:
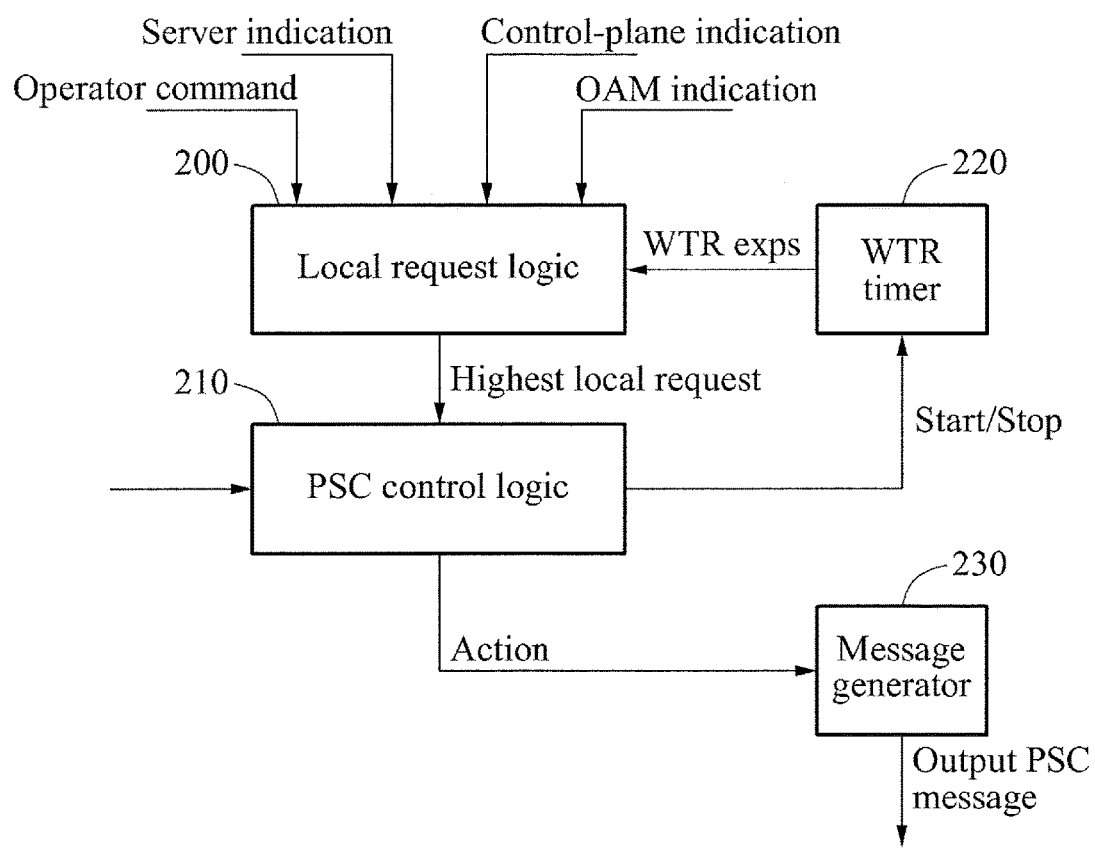
FIG. 2 is a diagram illustrating an example of a configuration of a protection state control logic of a node using a protection state coordination (PSC) message according to an embodiment of the present invention.

FIG. 2 is a diagram illustrating an example of a protection state control logic of a node using a protection state coordination (PSC) message.

Referring to FIG. 2, the protection state control logic of the node includes a local request logic unit 200 and a PSC control logic 210, a wait-to-restore (WTR) timer 220, and a message generator 230.

The local request logic unit 200 receives an operation, administration, and maintenance (OAM) indication, a server indication, an operator command, and a local control-plane indication, and a trigger from the WTR timer 220. The local request logic unit 200 determines a local request having a highest priority, which is hereinafter referred to as a highest local request, based on all local request sources. The highest local request is input to the PSC control logic 210, and the PSC control logic 210 cross-checks the input highest local request against information received from a far-end LER. Thus, the PSC control logic 210 determines an action to be performed, a message to be sent to the far-end LER, and a current state of a protected domain.

Figure 3:
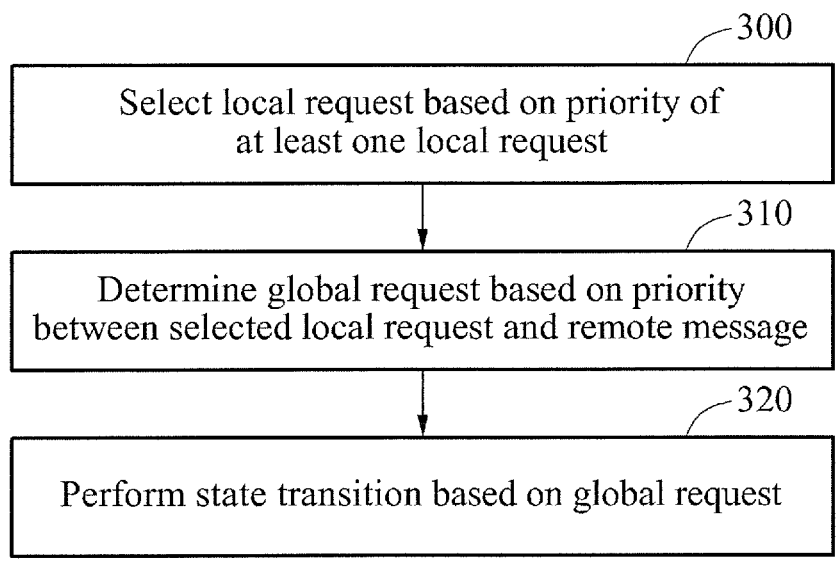
FIG. 3 is a flowchart illustrating an example of a linear protection switching method of a node according to an embodiment of the present invention.
Figure 4:
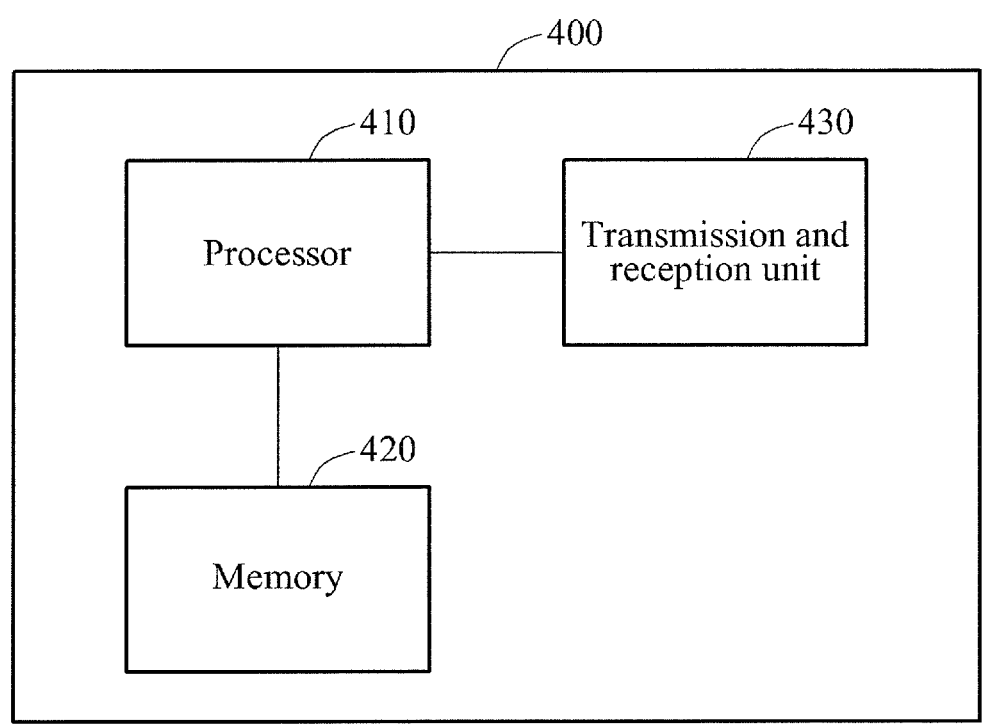
FIG. 4 is a block diagram illustrating an example of a node according to an embodiment of the present invention.

FIG. 3 is a flowchart illustrating an example of a linear protection switching method of a node 400, and FIG. 4 is a block diagram illustrating the node 400 according to an embodiment of the present invention.

Referring to FIGS. 3 and 4, the node 400 includes a processor 410, a memory 420, and a transmission and reception unit 430. The processor 410 may be designed to implement procedures and methods proposed herein. The memory 420 is connected to the processor 410 and stores various sets of information associated with operations of the processor 410. The transmission and reception unit 430 is connected to the processor 410, and transmits and receives a signal.

Referring to FIG. 3, in operation 300, the node 400 selects a local request based on a priority of at least one local request.

In operation 310, the node 400 determines a global request based on a priority between the selected local request and a remote message. When the remote message is determined to be the global request, the node 400 may transmit a cancel command to cancel the selected local request. When the node 400 is in a remote state in which the global request is determined by the remote message and a new local request occurs, and the new local request and the remote message request different protection actions despite the new local request and the remote message having an equal priority, the remote message may be determined to be the global request. When the node 400 is in a local state in which the global request is determined by the selected local request and a new remote message is received, and the local request and the new remote message request different protection actions despite the local request and the new remote message having an equal priority, the global request may be determined in accordance with a predetermined rule.

In operation 320, the node 400 performs a state transition based on the global request. The node 400 performs the state transition using a prestored state transition table. When the local request is determined to be the global request, the node 400 may select a final state using a state transition table for local requests (refer to Table 2), which is also referred to as a local state transition table. Conversely, when the remote message is determined to be the global request, the node 400 may select a final state using a state transition table for remote requests (refer to Table 3), which is also referred to as a remote state transition table.

The linear protection switching method using a linear protection switching logic will be further described hereinafter.

Figure 5:
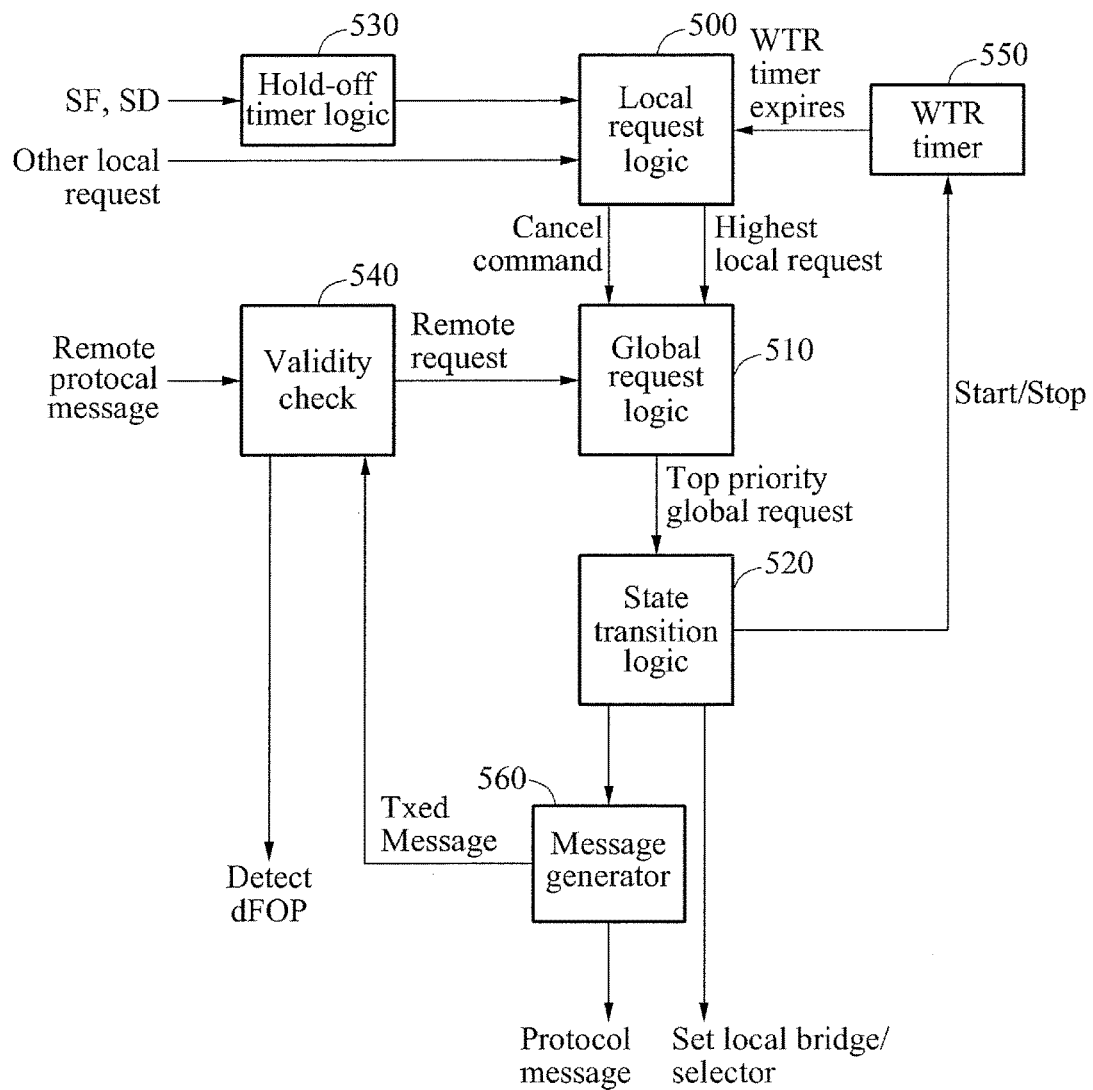
FIG. 5 is a diagram illustrating an example of a configuration of a function logic indicating an MPLS-TP linear protection switching algorithm operating principle according to an embodiment of the present invention.

FIG. 5 is a diagram illustrating an example of a linear protection switching logic according to an embodiment of the present invention.

Referring to FIG. 5, a linear protection switching method may be performed by the nodes 110 and 120 located at both ends of a protected domain 140 of FIG. 1.

A bidirectional switching may be achieved by transmitting a local switching request to a remote node through a request field and a fault path field in protection switching information exchanged between the nodes 110 and 120. A data path field in the protection switching information may include state information on a local bridge and a local selector and generate a fault, and a discrepancy between the nodes 110 and 120 may be detected therein.

The example described in the foregoing relates to a method of managing a switching state and performing a linear protection switching using a protection switching information message such as a PSC message in a packet network or a packet transport network. The protected domain 140 includes a working path including two unidirectional MPLS paths with one having a different direction from the other, and a protection path including two unidirectional MPLS paths with one having a different direction from the other. The protection switching information message such as the PSC message may be transmitted through the protection path.

A newly defined priority may be applied to a local request logic 500 and a global request logic 510 of FIG. 5.

Types of messages used herein are as follows. The types of the messages may be inputs to be filled in the request field of a message format such as the PSC message in accordance with a protection switching information protocol.

Lockout of protection (LO)
Forced Switch (FS)
Signal Fail (SF)
Signal Degrade (SD)
Manual Switch (MS)
Wait-To-Restore (WTR)
Exercise (EXER)
Reverse Request (RR)
Do-Not-Revert (DNR)
No Request (NR)

When a plurality of local inputs appear, the local request logic 500 analyzes a priority of each input and determines a local input having a highest priority, which is also referred to as a highest local request, based on a result of the analyzing.

The highest local request determined in the local request logic 500 may be transmitted to the global request logic 510 and passed to the global request logic 510. The global request logic 510 may then determine a top priority global request by comparing the highest local request being passed to the global request logic 510 to a last received remote message.

That is, when the remote message is received to enter the global request logic 510, the highest local request may be compared to the remote message in the global request logic 510 and the top priority global request may be determined. The determined top priority global request may be used to determine a state transition in a state transition logic 520, which is a state machine.

When a preset value of a hold-off timer logic 530 is not "0," an arrival of a new fault, for example, an SF and an SD, at the hold-off timer logic 530 may not be immediately notified to the local request logic 500 and the notification may be held off for a predetermined period of time.

When information reaches a local node from a remote node through a remote protocol message including protection switching information, a validity check 540 may be performed to verify whether the received protocol message is valid. The validity check 540 may include determining whether a bridge type is matched, whether a type length value (TLV) is correct, whether working/protection configuration is matched, whether switching is performed at a predetermined time, and whether the protocol message is received in a predetermined period of time when a fault does not occur on a protection path. Here, a warning may be sent to an operator as a need arises.

The global request logic 510 may process a priority of local and remote requests. The priority of local inputs and remote inputs of remote messages may be defined as in Table 1. In Table 1, the priority is defined from a highest priority, for example, an Operator Clear (OC), to a lowest priority, for example, an NR.

TABLE 1

| Priority | Request | Remark |
| --- | --- | --- |
| 1 | OC | Local only |
| 2 | LO | Local and remote |
| 3 | Clear Signal Fail or Degrade | Local only |
| 4 | Signal Fail on Protection path (SF-P) | Local and remote |
| 5 | FS | Local and remote |
| 6 | Signal Fail on Working path (SF-W) | Local and remote |
| 7 | Signal Degrade on either Protection path or Working path (SD-P or SD-W) | Local and remote |
| 8 | Manual Switch to either Protection path or Working path (MS-P or MS-W) | Local and remote |
| 9 | WTR Expires (WTRExp) | Local only |
| 10 | WTR | Remote only |

TABLE 1-continued

| Priority | Request | Remark |
| --- | --- | --- |
| 11 | EXER | Local and remote |
| 12 | RR | Remote only |
| 13 | DNR | Remote only |
| 14 | NR | Local and remote |

Referring to Table 1, for requests corresponding to "Local only," a signal and corresponding information may not be transmitted to a far end node or a far end LER. Requests corresponding to "Remote only" may not appear in the local request logic 500 and be transmitted from the far end node. For example, a priority of a WTR may be applied only when a WTR message generated at a remote node is received. The WTR message may be generated when the remote node operates a WTR timer in a WTR state without a valid local request.

Fundamentally, in case of requests corresponding to "Local and remote", the remote request received from the far end node may be assigned a priority immediately below the same local request.

However, requests having an equal priority, for example, "SD-P" or "SD-W" and "MS-P" or "MS-W," may be processed as per the following procedure.

1. When two local inputs having an equal priority and requesting different processing, for example, when one requests a switch to the working path and the other requests a switch to the protection path, enter, a first entering input may have a higher priority and a service may be continuously performed based on the first input and no changes may occur by a second entering input (first-come, first-served).

2. When the global request logic 510 has a remote message having a priority equal to the highest local request and a fault path (FPath) value equal to a protection switching information request field such as PSC and requesting an equal protection action, for example, an identical switching action, a local input may be considered to have a higher priority than a priority of the remote message.

3. When the highest local request comes to the global request logic 510, when a remote message that requests a different protection action exists and the highest local request and the remote message have an equal priority, then the highest local request may be ignored and the remote message remains to be the top priority global request. The different protection action means that the highest local request and the remote message have a same request value and have a different FPath value. In a case of a manual switch (MS) command, for example, an MS-P or an MS-W, a local MS command requesting a different action may be ignored.

4. When a remote message comes to the global request logic 510, when the highest local request that requests a different protection action exists, and the highest local request and the remote message have an equal priority, then the top priority global request may be required to be determined by the following rule.

(1) For simultaneous MS requests, when two MS-P requests and an MS-W request are simultaneously input to a local input and a remote message, a node may be in a local switching administrative state due to state transition by the local input and the MS-W request may have a higher priority than the MS-P requests. A node having an MS-W request for a manual switch to a local working path may maintain the MS-W request as the top priority global request. Another node, for example, a far end node, having an MS-P request for a manual switch to a local protection path may delete the MS-P request and internally generate an OC request. Thus, both nodes may select the working path.

(2) For simultaneous SD requests, an SD detected on a standby path dissimilar to a path to be selected by a selector to transmit and receive user data traffic irrespective of a local request and a remote message may have a higher priority than a priority of an SD detected on an active path selected by the selector to transmit and receive the user data traffic. A node at which the SD is detected on the standby path may maintain the SD request on a local standby path to be the top priority global request. Another node having an SD request on a local active path may use, as the top priority global request, an SD on a remote standby path to determine a state in a state transition table. A differentiation between active paths and standby paths may be based on a path selected to transmit and receive the user data traffic immediately before the local SD request is selected as the top priority global request.

(3) An NR is another exception in an equal local request situation. A received NR message may need to be used in the state transition table when an outstanding local request is nonexistent. When no requests are present at a local node, which indicates an NR, a received remote NR may become the top priority global request.

Also, fundamental principles for acceptance and retention of a local input are as follows:

A local input indicating a defect, for example, a fault on a protection path, a fault on a working path fault, an SD on a protection path, and an SD on a working path, which is a local defect input, may need to be continuously accepted and retained by the local request logic 500 as long as a defect condition exists. When a local request having a higher priority than the local defect input is present, the local request having the higher priority may be selected as a highest local request and be passed to the global request logic 510. The local defect input may remain in the local request logic 500. When the local input having the higher priority disappears but the defect condition still remains, the local defect input having a lower priority may become the highest local request.

An "OC" command, "Clear signal fail or degrade," "WTRExp," and the like may not be continued and thus, these may disappear when a priority, state transition, and a switching action are determined after a one-time appearance in the local request logic 500.

When a higher priority input is present in the local request logic 500, an LO, an FS, an MS, an EXER, and the like may be rejected. When a new higher priority local request including an operator command is accepted, a previous lower priority local operator command may be cancelled. When a new higher priority remote input is received, the lower priority local operator command may be cancelled through a cancel command. The cancelled operator command may not be restored until such a command is given by an operator again. That is, when the global request logic 510 determines a remote input to be a global request, the global request logic 510 may transmit, to the local request logic 500, the cancel command to cancel the local operator command. When the local operator command is ignored due to the remote input, the global request logic 510 may inform the local request logic 500 that the local operator command is cancelled, which may be performed prior to state transition performed by a node.

Based on the preferential processing rules described in the foregoing, when a change in the highest local request occurs or a protection switching information message such as a new remote PSC message is received, the top priority global request may be analyzed and determined, and a final state of the node may be determined by referring to state transition tables in the global request logic 510.

Tables 2 and 3 indicate a local state transition table and a remote state transition table, respectively.

Clear or clearance of signal fail or degrade causing the next state to be Normal, WTR or DNR, then all the local and remote requests should be re-evaluated as if the node is in the state specified in the footnotes (refer to Table 5) to the state transition tables, before deciding the final state. The re-evaluation may be an internal working action limited to a

TABLE 2

|         | OC  | LO      | SFDc | SF-P   | FS    | SF-W   | SD-P   | SD-W   | MS-W   | MS-P   | WTRExp | EXER |
|---------|-----|---------|------|--------|-------|--------|--------|--------|--------|--------|--------|------|
| N       | i   | UA:LO:L | I    | UA:P:L | SA:F:L| PF:W:L | UA:DP:L| PF:DW:L| SA:MW:L| SA:MP:L| I      | E:L  |
| UA:LO:L | (1) | I       | I    | I      | I     | I      | I      | I      | I      | I      | I      | I    |
| UA:P:L  | I   | UA:LO:L | (1)  | I      | I     | I      | I      | I      | I      | I      | I      | I    |
| UA:DP:L | I   | UA:LO:L | (1)  | UA:P:L | SA:F:L| PF:W:L | I      | I      | I      | I      | I      | I    |
| UA:LO:R | I   | UA:LO:L | I    | UA:P:L | I     | PF:W:L | UA:DP:L| PF:DW:L| I      | I      | I      | I    |
| UA:P:R  | I   | UA:LO:L | I    | UA:P:L | I     | PF:W:L | UA:DP:L| PF:DW:L| I      | I      | I      | I    |
| UA:DP:R | I   | UA:LO:L | I    | UA:P:L | SA:F:L| PF:W:L | UA:DP:L| PF:DW:L| I      | I      | I      | I    |
| PF:W:L: | I   | UA:LO:L | (2)  | UA:P:L | SA:F:L| I      | I      | I      | I      | I      | I      | I    |
| PF:DW:L | I   | UA:LO:L | (2)  | UA:P:L | SA:F:L| PF:W:L | I      | I      | I      | I      | I      | I    |
| PF:W:R  | I   | UA:LO:L | I    | UA:P:L | SA:F:L| PF:W:L | UA:DP:L| PF:DW:L| I      | I      | I      | I    |
| PF:DW:R | I   | UA:LO:L | I    | UA:P:L | SA:F:L| PF:W:L | UA:DP:L| PF:DW:L| I      | I      | I      | I    |
| SA:F:L  | (3) | UA:LO:L | I    | UA:P:L | I     | I      | I      | I      | I      | I      | I      | I    |
| SA:M:W:L| (1) | UA:LO:L | I    | UA:P:L | SA:F:L| PF:W:L | UA:DP:L| PF:DW:L| i      | I      | I      | I    |
| SA:MP:L | (3) | UA:LO:L | I    | UA:P:L | SA:F:L| PF:W:L | UA:DP:L| PF:DW:L| I      | I      | I      | I    |
| SA:F:R  | I   | UA:LO:L | I    | UA:P:L | SA:F:L| PF:W:L | UA:DP:L| PF:DW:L| I      | I      | I      | I    |
| SA:M:W:R| I   | UA:LO:L | I    | UA:P:L | SA:F:L| PF:W:L | UA:DP:L| PF:DW:L| SA:MW:L| I      | I      | I    |
| SA:MP:R | I   | UA:LO:L | I    | UA:P:L | SA:F:L| PF:W:L | UA:DP:L| PF:DW:L| I      | SA:MP:L| I      | I    |
| WTR     | (4) | UA:LO:L | i    | UA:P:L | SA:F:L| PF:W:L | UA:DP:L| PF:DW:L| SA:MW:L| SA:MP:L| (6)    | I    |
| DNR     | I   | UA:LO:L | I    | UA:P:L | SA:F:L| PF:W:L | UA:DP:L| PF:DW:L| SA:MW:L| SA:MP:L| I      | E: :L|
| E: :L   | (5) | UA:LO:L | I    | UA:P:L | SA:F:L| PF:W:L | UA:DP:L| PF:DW:L| SA:MW:L| SA:MP:L| I      | I    |
| E: :R   | I   | UA:LO:L | I    | UA:P:L | SA:F:L| PF:W:L | UA:DP:L| PF:DW:L| SA:MW:L| SA:MP:L| I      | E: :L|

TABLE 3

|          | LO      | SF-P    | FS      | SF-W    | SD-P    | SD-W    | MS-W    | MS-P    | WTR | EXER  | RR  | DNR | NR  |
|----------|---------|---------|---------|---------|---------|---------|---------|---------|-----|-------|-----|-----|-----|
| N        | UA:LO:R | UA:P:R  | SA:F:R  | PF:W:R  | UA:DP:R | PF:DW:R | SA:MW:R | SA:MP:R | I   | E: :R | I   | I   | I   |
| UA:LO:L  | I       | i       | I       | I       | I       | I       | I       | I       | I   | I     | I   | I   | I   |
| UA:P:L   | UA:LO:R | I       | I       | I       | I       | I       | I       | I       | I   | I     | I   | I   | I   |
| UA:DP:L  | UA:LO:R | UA:P:R  | SA:F:R  | PF:W:R  | I       | (7)     | I       | I       | I   | I     | I   | I   | I   |
| UA:LO:R  | I       | UA:P:R  | SA:F:R  | PF:W:R  | UA:DP:R | UA:DP:R | SA:MW:R | SA:MP:R | I   | E: :R | I   | I   | N   |
| UA:P:R   | UA:LO:R | I       | SA:F:R  | PF:W:R  | UA:DP:R | UA:DP:R | SA:MW:R | SA:MP:R | I   | E: :R | I   | I   | N   |
| UA:DP:R  | UA:LO:R | UA:P:R  | SA:F:R  | PF:W:R  | I       | UA:DP:R | SA:MW:R | SA:MP:R | I   | E: :R | I   | I   | N   |
| PR:W:L   | UA:LO:R | UA:P:R  | SA:F:R  | I       | I       | I       | I       | I       | I   | I     | I   | I   | I   |
| PF:DW:L  | UA:LO:R | UA:P:R  | SA:F:R  | PF:W:R  | (8)     | I       | I       | I       | I   | I     | I   | I   | I   |
| PF:W:R   | UA:LO:R | UA:P:R  | SA:F:R  | I       | UA:DP:R | UA:DP:R | SA:MW:R | SA:MP:R | (9) | E: :R | I   | (10)| (11)|
| PF:DW:R  | UA:LO:R | UA:P:R  | SA:F:R  | PF:W:R  | UA:DP:R | I       | SA:MW:R | SA:MP:R | (9) | E: :R | I   | (10)| (11)|
| SA:F:L   | UA:LO:R | UA:P:R  | I       | I       | I       | I       | I       | I       | I   | I     | I   | I   | I   |
| SA:M:W:L | UA:LO:R | UA:P:R  | SA:F:R  | PF:W:R  | UA:DP:R | UA:DP:R | i       | I       | I   | I     | I   | I   | I   |
| SA:MP:L  | UA:LO:R | UA:P:R  | SA:F:R  | PF:W:R  | UA:DP:R | UA:DP:R | I       | I       | I   | I     | I   | I   | I   |
| SA:F:L   | UA:LO:R | UA:P:R  | L       | PF:W:R  | UA:DP:R | UA:DP:R | SA:MW:R | SA:MP:R | I   | E: :R | I   | DNR | N   |
| SA:M:W:R | UA:LO:R | UA:P:R  | SA:F:R  | PF:W:R  | UA:DP:R | UA:DP:R | I       | SA:MP:R | I   | E: :R | I   | I   | N   |
| SA:MP:R  | UA:LO:R | UA:P:R  | SA:F:R  | PF:W:R  | UA:DP:R | UA:DP:R | SA:MW:R | I       | I   | E: :R | I   | DNR | N   |
| WTR      | UA:LO:R | UA:P:R  | SA:F:R  | PF:W:R  | UA:DP:R | UA:DP:R | SA:MW:R | SA:MP:R | I   | I     | I   | I   | (12)|
| DNR      | UA:LO:R | UA:P:R  | SA:F:R  | PF:W:R  | UA:DP:R | UA:DP:R | SA:MW:R | SA:MP:R | I   | E: :R | I   | I   | I   |
| E: :L    | UA:LO:R | UA:P:R  | SA:F:R  | PF:W:R  | UA:DP:R | UA:DP:R | SA:MW:R | SA:MP:R | (13)| I     | I   | I   | I   |
| E: :R    | UA:LO:R | UA:P:R  | SA:F:R  | PF:W:R  | UA:DP:R | UA:DP:R | SA:MW:R | SA:MP:R | i   | I     | I   | DNR | N   |

Referring to Tables 2 and 3, an operating method of searching for a final state of a node from the state transition tables may comply with the following rules.

1. When the top priority global request determining the state transition is the highest local request, Table 2 indicating the local state transition table may be used to determine a next state of the node.

2. When, in a remote state, the highest local request corresponds to a fault condition such as an SF-P, an SF-W, an SD-P, and an SD-W, the fault condition may need to be permanently reflected in a request field of a protection switching information message such as a PSC message and an FPath field.

3. For a node currently in a local state, if the top priority global request is changed to local node, and a protection switching information message such as a PSC may be determined and generated based on the final state.

4. A WTR timer may be initiated only when a node recovers from a local SF or a local SD state and enters a WTR state. When the node enters the WTR state by a remote WTR message, the WTR timer may not start. When a local or a remote request is triggered to perform state transition from the WTR state to another state, an operation of the WTR timer may be suspended.

First lines of Tables 2 and 3 relate to local requests and remote messages, respectively, and first columns of Tables 2 and 3 indicate final states to be determined by an input. Here, "N" denotes a normal state. "WTR" is a state in which the WTR timer is on standby while operating before a path through which the node transmits and receives data reverts to a working path from a protection path when a fault disappears. "DNR" is a state in which the path through which the node transmits and receives data does not revert to the working but is maintained to be the protection path even when the fault disappears.

Also, in indications using three portions divided by "," and ":," a first letter(s) indicates a state, a second letter(s) indicates a request causing entrance to the state, and a third letter(s) is indicated as "L" when the request locally occurs and as "R" when the request remotely occurs. The second letter(s) may include "LO," "P" indicating a fault on the protection path, "W" a fault on the working path, "DP" indicating signal degradation on the protection path, "DW" indicating signal degradation on the working path, "F" indicating a forced switch, "MW" indicating a manual switch to the working path, and "MP" indicating a manual switch to the protection path. In the first letter(s), "UA" indicates an unavailable state in which the protection path is not available, "PF" indicating a protecting failure state, "SA" indicates a switching administrative state in which switching is performed based on an operator command, and "E" indicates a state in which an exercise is performed based on an exercise command.

Detailed descriptions are as follows:

"UA:LO:L" indicates an unavailable state due to a local LO command.

"UA:P:L" indicates an unavailable state due to a local SF-P.

"UA:DP:L" indicates an unavailable state due to a local SD-P.

"UA:LO:R" indicates an unavailable state due to a remote LO message.

"UA:P:R" indicates an unavailable state due to a remote SF-P message.

"UA:DP:R" indicates an unavailable state due to a remote SD-P message.

"PF:W:L" indicates a protecting failure state due to a local SF-W.

"PF:DW:L" indicates a protecting failure state due to a local SD-W.

"PF:W:R" indicates a protecting failure state due to a remote SF-P message.

"PF:DW:R" indicates a protecting failure state due to a remote SD-W message.

"SA:F:L" indicates a switching administrative state due to a local FS command.

"SA:MW:L" indicates a switching administrative state due to a local MS-W command.

"SA:MP:L" indicates a switching administrative state due to a local MS-P command.

"SA:F:R" indicates a switching administrative state due to a remote FS message.

"SA:MW:R" indicates a switching administrative state due to a remote MS-W message.

"SA:MP:R" indicates a switching administrative state due to remote MS-P message.

"E::L" indicates an exercise state due to a local EXER command.

"E::R" indicates an exercise state due to a remote EXER message. Respective bit values of a request field of a protection switching information message such as a PSC to be sent in each state, an FPath, and a path may be predetermined. Messages indicated in Table 4 may be indicated in a form of a request, for example, the FPath and the path. For example, "NR(0,0)" indicates an NR request and that the FPath is "0" and the path is "0."

Table 4 indicates messages to be sent in each state. When a message in a different form from a message to be sent in each state is required to be sent, the message may be sent as described in the footnotes to the state transition tables.

TABLE 4

| State | Message |
|---|---|
| N | NR(0, 0) message |
| UA:LO:L | LO(0, 0) message |
| UA:P:L | SF(0, 0) message |
| UA:DP:L | SD(0, 0) message |
| UA:LO:R | Highest local request (local FPath, 0), to be sent in a form of a message, which indicates that a current highest local request is included in a request field and a current local fault path is indicated in an FPath field. |
| UA:P:R | Highest local request (local FPath, 0) message |
| UA:DP:R | Highest local request (local FPath, 0) message |
| PF:W:L | SF(1, 1) message |
| PF:DW:L | SD(1, 1) message |
| PF:W:R | Highest local request (local FPath, 1) message |
| PF:DW:R | Highest local request (local FPath, 1) message |
| SA:F:L | FS(1, 1) message |
| SA:MW:L | MS(0, 0) message |
| SA:MP:L | MS(1, 1) message |
| SA:F:R | Highest local request (local FPath, 1) message |
| SA:MW:R | NR(0, 0) message |
| SA:MP:R | NR(0, 1) message |
| WTR | WTR(0, 1) message |
| DNR | DNR(0, 1) message |
| E::L | Send an EXER(0, x) message, wherein "x" indicates that a path in use may be indicated as is to transmit traffic when an EXER command occurs. |
| E::R | Send an RR(0, x) message, wherein "x" indicates that a path in use may be indicated as is to transmit traffic when an RR message is generated. |

Table 5 provides descriptions of operations corresponding to the footnotes to the state transition tables of Tables 2 and 3.

TABLE 5

| Note | Operation |
|---|---|
| (1) | Perform re-evaluation to determine a final state, assuming that a node is in a normal state. |
| (2) | When a local input and a last received remote message subsequent to an SFDc is an NR, a node set to be revertive may enter a WTR state and a node set to be non-revertive may enter a DNR state. Perform re-evaluation to determine a final state, assuming that a node is in a normal state in all other cases aside from the instance described in the foregoing. |
| (3) | Perform re-evaluation to determine a final state, assuming that a node set to be revertive is in a normal state, and perform re-evaluation to determine a final state, assuming that a node set to be non-revertive is in a DNR state. |

TABLE 5-continued

| Note | Operation |
|---|---|
| (4) | Maintain a WTR state and transmit a protection switching information message such as an NR(0, 1) [Request field value is NR, Fpath = 0, Path = 1] PSC<br>Stop a WTR timer during an operation of the timer. |
| (5) | Perform re-evaluation to determine a final state, assuming that a node is in a normal state when a path value is "0," and perform re-evaluation to determine a final state, assuming that a node is in a DNR state when a path value is "1." |
| (6) | Maintain a WTR state and transmit a protection switching information message such as an NR(0, 1) [Request field value is NR, Fpath = 0, Path = 1] PSC |
| (7) | When a path field of a received SD-W message has a value of "0," ignore the message.<br>When a path field of a received SD-W message has a value of "1," enter a PF:DW:R state and transmit an SD(0, 1). |
| (8) | When a path field of a received SD-P message has a value of "1," ignore the message.<br>When a path field of a received SD-P message has a value of "0," enter a UA:DP:R state and transmit an SD(0, 1). |
| (9) | Perform state transition to a WTR state, and continuously send a message currently being transmitted. |
| (10) | Perform state transition to a DNR state, and continuously send a message currently being transmitted. |
| (11) | Perform state transition to a WTR state when a request field value of a received remote message is NR, a path field value is "1," and a node is set to be revertive.<br>Perform state transition to a DNR state in other cases aside from the instance described in the foregoing.<br>Perform state transition to a normal state when a request field value of a received remote message is NR and a path field value is "0." |
| (12) | When a WTR timer is operating at a receiving node, maintain a current state and message. When a WTR timer is not operating, perform state transition to a normal state. |
| (13) | Perform state transition to a WTR state and transmit an NR(0, 1) message.<br>A WTR timer is not initiated. |

As described in the foregoing, a linear protection switching method according to an embodiment of the present invention may be applicable to state transition for 1+1 unidirectional protection.

A local input may only be applied without remote information to operate. Thus, the 1+1 unidirectional protection may be enabled only by applying a local request based state transition table of the state transition tables.

In the local request based state transition table, a request field value in a received remote message may be ignored and thus, an NR may be permanently applied.

Footnote (6) may be changed and thus, a state of a node may be changed to a normal state when the WTR timer is expired.

Here, an EXER may not be applied.

Figure 6:
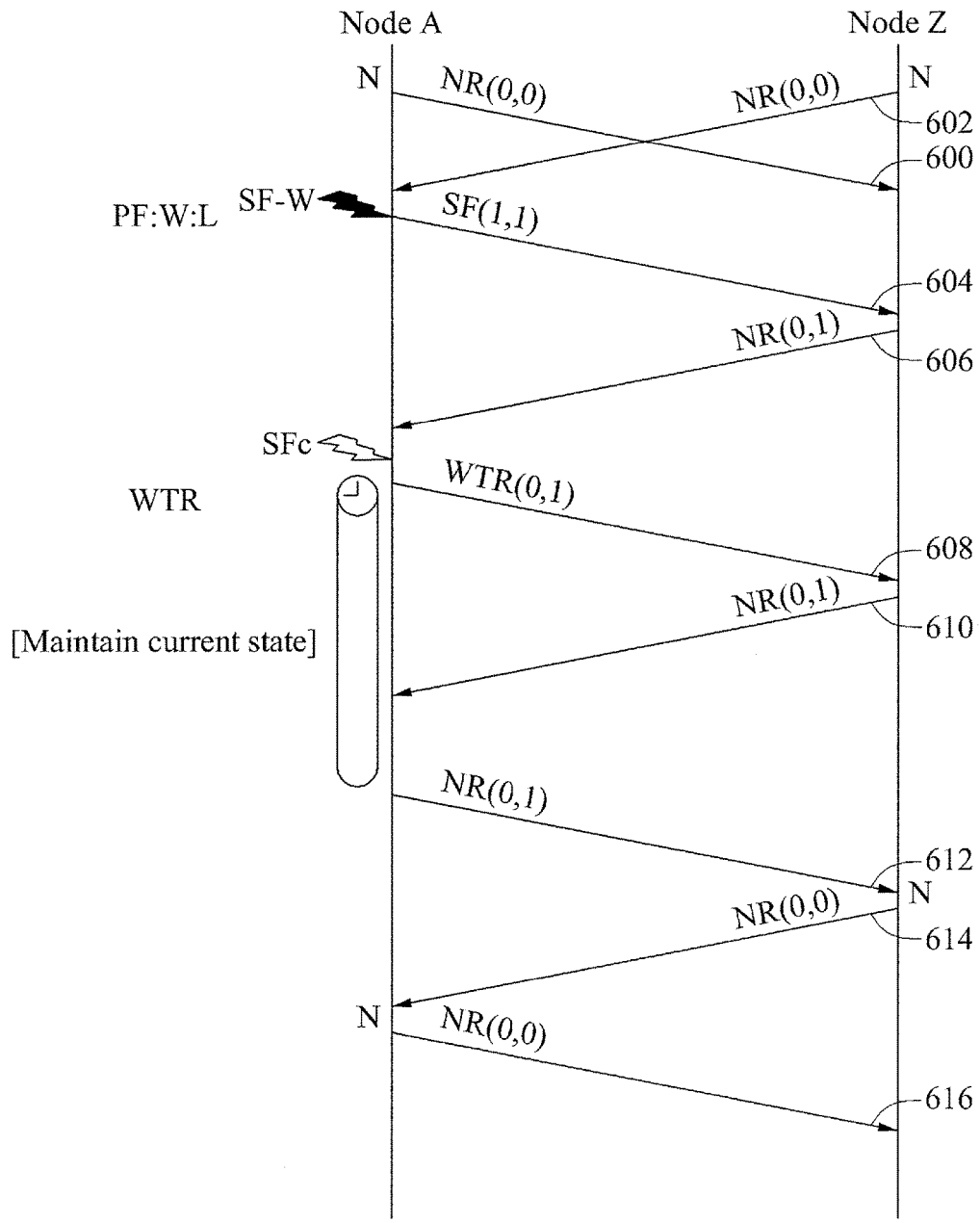
FIG. 6 is a flowchart illustrating an example of a protection switching method applied when one node detects a fault in a one-on-one revertive mode state according to an embodiment of the present invention.
Figure 7:
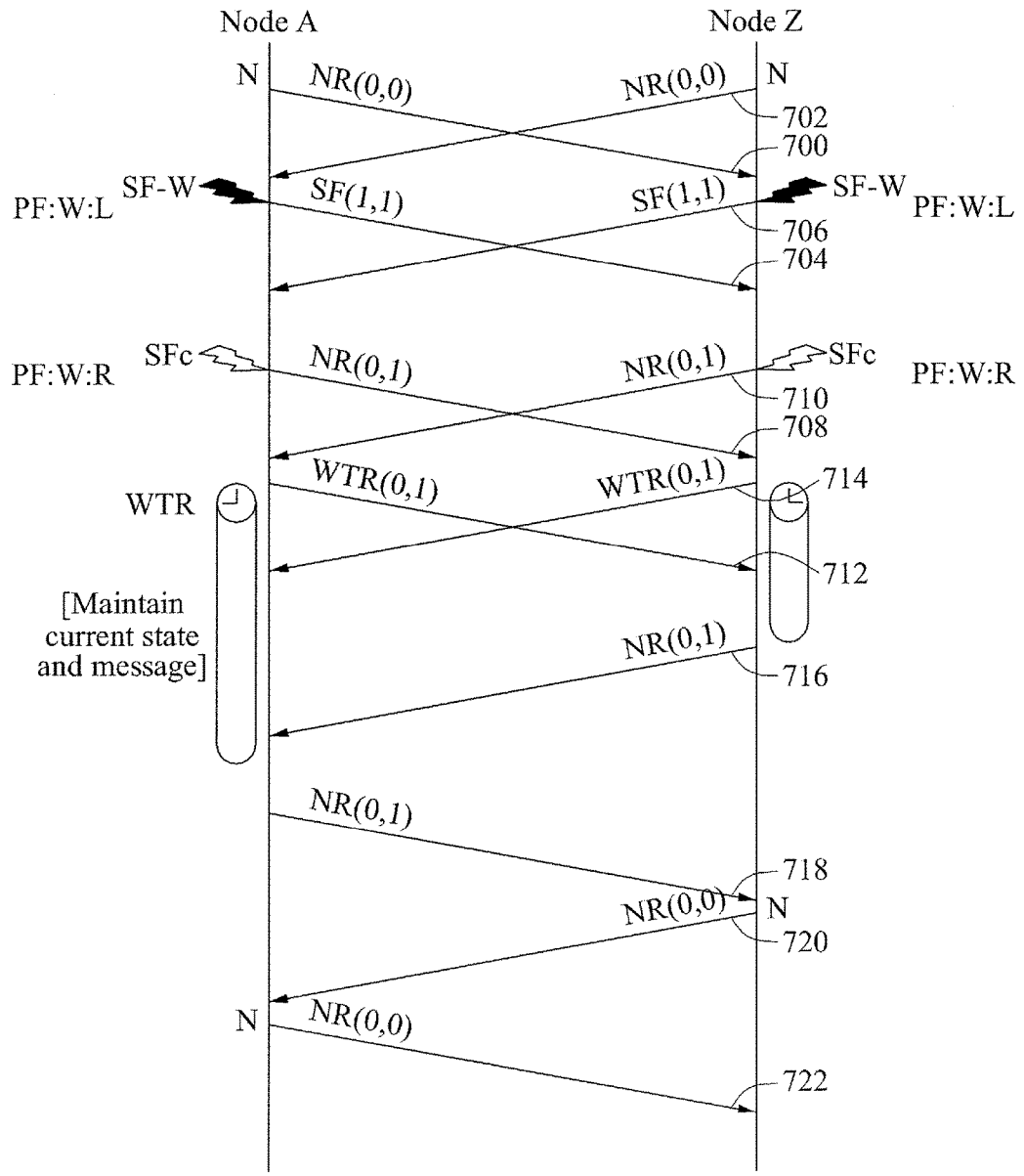
FIG. 7 is a flowchart illustrating an example of a protection switching method applied when both nodes detect a fault in a one-on-one revertive mode state according to an embodiment of the present invention.
Figure 8:
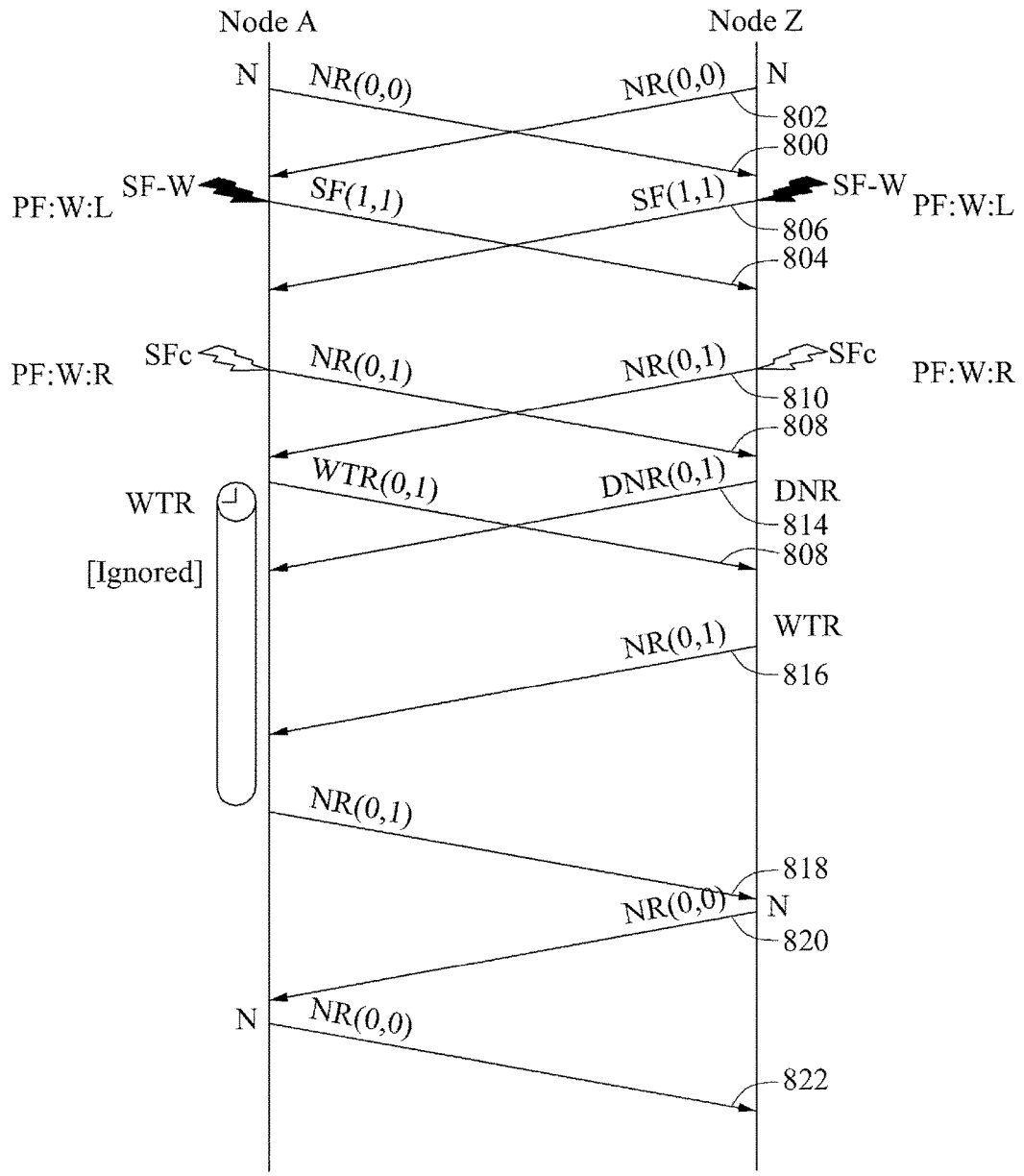
FIG. 8 is a flowchart illustrating an example of a protection switching method applied when each node detects a fault in different one-on-one revertive mode states according to an embodiment of the present invention.

FIGS. 6 through 8 are flowcharts illustrating examples of two nodes performing linear protection switching based on a linear protection switching method according to an embodiment of the present invention.

FIG. 6 is a flowchart illustrating an example of a protection switching method applied when one node detects a fault in a one-on-one revertive mode state according to an embodiment of the present invention.

Referring to FIG. 6, in operations 600 and 602, both a node A and a node Z are in a normal state and transmit an NR(0,0) message.

In operation 604, when an SF-W occurs on a unidirectional path from the node A to the node A, the node A recognizing the SF-W enters a PF:W:L state and transmits an SF(1,1) message to the node Z. Thus, traffic may be switched to a protection path.

In operation 606, the node Z receiving the SF(1,1) message from the node A verifies a fault of the node A and transmission and reception of the traffic through the protection path, enters a PF:W:R state, switches a path for the transmission and the reception of the traffic to the protection path, and transmits an NR(0,1) message to the node A.

In operation 608, when the SF-W disappears, the state of the node A is changed to a WTR state, and the node A transmits a WTR(0,1) message to the node Z because a last received message is the NR(0,1) message. In operation 610, the state of the node Z receiving the WTR(0,1) message is changed to the WTR state, and the node Z transmits the NR(0,1) message to the node A.

In operation 612, when a WTR timer is expired at the node A. the node A transmits the NR(0,1) message.

In operation 614, the state of the node Z receiving the NR(0,1) message is changed to the normal state, and the node Z sets a selector and a bridge as a working path and transmits the NR(0,0) message.

In operation 616, when the NR(0,0) message arrives at the node A, the state of the node A is changed to the normal state and the traffic is switched to the working path to be restored.

FIG. 7 is a flowchart illustrating an example of a protection switching method applied when both nodes detect a fault in a one-on-one revertive mode state according to an embodiment of the present invention.

Referring to FIG. 7, in operations 700 and 702, both a node A and a node Z are in a normal state and transmit an NR(0,0) message.

In operations 704 and 706, when an SF-W occurs, each node enters a PF:W:L state and transmits an SF(1,1) message. Thus, traffic is switched to a protection path. Each node receiving the SF(1,1) message verifies that a far end node also transmits and receives the traffic through the protection path.

In operations 708 and 710, when the SF-W disappears, the state of each node is changed to a PF:W:R state, and each node transmits an NR(0,1) message because a last received message is an SF-W message.

In operations 712 and 714, the state of each node receiving the NR(0,1) message is changed to a WTR state, and each node starts operating a WTR timer and transmits a WTR(0,1) message.

In operation 716, when the WTR timer is expired at the node Z, the node Z transmits the NR(0,1) message because a last received message is a WTR message.

Here, the node A receiving the NR(0,1) message maintains a WTR state, and continuously transmits the WTR message as indicated in a state transition table.

In operation 718, however, when the WTR timer is expired at the node A, the node A transmits the NR(0,1) message.

In operation 720, the state of the node Z receiving the NR(0,1) message is changed to the normal state, and the node Z sets a selector and a bridge as a working path and transmits the NR(0,0) message.

In operation 722, the state of the node A receiving the NR(0,0) message is changed to the normal state, and the traffic is switched to the working path to be restored.

FIG. 8 is a flowchart illustrating an example of a protection switching method applied when each node detects a fault in different one-on-one revertive mode states according to an embodiment of the present invention. In the example of FIG. 8, a node A is in a revertive mode and a node Z is in a non-revertive mode.

Referring to FIG. 8, in operations 800 and 802, both the node A and the node Z are in a normal state, and each node transmits an NR(0,0) message. In operations 804 and 806, when an SF-W occurs, each node enters a PF:W:L state and transmits an SF(1,1) message. Thus, traffic is switched to a protection path.

Here, each node receiving the SF(1,1) message may verify that a far end node also transmits and receives the traffic through the protection path.

In operations 808 and 810, when the SF-W disappears, the state of each node is changed to a PF:W:R state and transmits an NR(0,1) message because a last received message is an SF-W message.

In operation 812, the state of the node A receiving the NR(0,1) message is changed to a WTR state, and the node A starts operating a WTR timer and transmits a WTR(0,1) message.

In operation 814, the state of the node Z being in the non-revertive mode is changed to a DNR state, and the node Z transmits a DNR(0,1) message.

Here, the node A being in the WTR state may maintain the WTR state when the NR message is received during an operation of the timer. The node Z being in the DNR state may ignore the NR message and maintain the DNR state when the NR message is received.

In operation 816, however, when the node Z receives the WTR message, the state of the node Z is changed to the WTR state, and the node Z transmits the NR(0,1) message.

In operation 818, when the WTR timer is expired at the node A, the node A transmits the NR(0,1) message.

In operation 820, when the NR(0,1) message arrives at the node Z, the state of the node Z is changed to the normal state, and the node Z sets a selector and a bridge as a working path and transmits the NR(0,0) message.

In operation 822, when the NR(0,0) message arrives at the node A, the state of the node A is changed to the normal state, and the traffic is switched to the working path to be restored.

According to example embodiments of the present invention, using a protection switching information message such as a PSC in a packet network or a packet transport network may solve potential issues that may occur when linear protection switching is performed and accordingly, a normal switching state management and protection switching may be enabled.

According to example embodiments of the present invention, requirements for protection switching stated in IETF RFC6378 may be satisfied by applying priority processing through which a priority level of an SF-P increases to be higher than a priority level of an FS and a priority level of Clear SF increases to be higher than an existing level, a new non-revertive method, an additional support of an MS-W to allow traffic to revert to a working path in a non-revertive state, an additional support of protection against an SD, and an additional support of an exercise command and accordingly, a normal switching state management and protection switching may be enabled.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described example embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A linear protection switching method of a node, the method comprising:
   determining a local request having a highest priority among at least one local request;
   determining a global request based on a priority between the determined local request and a remote message; and
   performing a state transition based on the global request,
   wherein when the new local request request and the remote message request different protection actions despite the new local request and the remote message having equal priorities, the remote message is determined to be the global request.

2. The method of claim 1, wherein, when the node is in a remote state in which the global request is determined by the remote message and a new local request occurs, the remote message is determined to be the global request.

3. The method of claim 1, wherein, when the node is in a local state in which the global request is determined by the local request and a new remote message is received, and the local request and the new remote message request different protection actions despite the local request and the new remote message having equal priorities, the global request is determined based on a predetermined rule.

4. The method of claim 3, wherein, when the local request is a manual switch to protection path (MS-P) request and the new remote message is a manual switch to working path (MS-W) request, the MS-W request is determined to be the global request.

5. The method of claim 3, wherein, when one of the determined local request and the remote message is a signal degrade (SD) request on a standby path and another is an SD request on an active path, the SD request on the standby path is determined to be the global request.

6. The method of claim 1, further comprising when the remote message is determined to be the global request:
   canceling the determined local request.

7. The method of claim 1, wherein, when the determined local request is ignored due to the remote message, the determining of the global request comprises informing a local request logic that the determined local request is cancelled.

8. The method of claim 7, wherein the informing occurs prior to the performing of the state transition.

9. The method of claim 1, wherein a prestored state transition table is used for the performing of the state transition.

10. The method of claim 9, wherein, when the determined local request is determined to be the global request, a prestored local state transition table is used for the performing of the state transition.

11. The method of claim 9, wherein, when the remote message is determined to be the global request, a prestored remote state transition table is used for the performing of the state transition.

12. The method of claim 1, wherein, when the node is in a remote state in which the global request is determined by a first remote message and a second remote message is received, and a priority of the second remote message is higher than a priority of the first remote message, the second remote message is determined to be the global request.

13. The method of claim 1, wherein, when the node is in a remote state in which the global request is determined by a first remote message and a second remote message is received, and a priority of the second remote message is lower than a priority of the first remote message and higher than a priority of the determined local request, the second remote message is determined to be the global request.

14. The method of claim 1, wherein, when the node is in a remote state in which the global request is determined by a first remote message and a second remote message is received, and a priority of the second remote message is lower than a priority of the first remote message and a priority of the determined local request, the determined local request is determined to be the global request.

15. The method of claim 1, wherein, when the node is in a remote state in which the global request is determined by a first remote message, the node transmits a transmission message comprising at least one of a top priority local request, a local fault path, and a determined traffic path.

16. A linear protection switching method of a node, the method comprising:
   selecting a local request based on a priority of at least one local request;
   determining a global request based on a priority between the selected local request and a remote message; and
   performing a state transition based on the global request,
   wherein, when the node is in a remote state in which the global request is determined by the remote message and a new local request occurs, and the new local request and the remote message request different protection actions despite the new local request and the remote message having equal priorities, the remote message is determined to be the global request.

17. The method of claim 16, wherein, when the node is in a local state in which the global request is determined by the local request and a new remote message is received, and the local request and the new remote message request different protection actions despite the local request and the new remote message having equal priorities, the global request is determined based on a predetermined rule.

18. The method of claim 17, wherein, when the local request is a manual switch to protection path (MS-P) request and the new remote message is a manual switch to working path (MS-W) request, the MS-W request is determined to be the global request.

19. A linear protection switching method of a node, the method comprising:
- selecting a local request based on a priority of at least one local request;
- determining a global request based on a priority between the selected local request and a remote message; and
- performing a state transition based on the global request,
- wherein, when the selected local request is ignored due to the remote message, the determining of the global request comprises informing a local request logic that the selected local request is cancelled.

20. The method of claim 19, wherein the informing occurs prior to the performing of the state transition.

* * * * *